(No Model.) 6 Sheets—Sheet 1.

O. SMITH.
PRESS.

No. 579,019. Patented Mar. 16, 1897.

Witnesses
Frank P. Prindle.
Henry C. Hazard.

Inventor
Oberlin Smith, by
Prindle and Russell, his attys.

THE NORRIS PETERS CO., PHOTO-LITHO., WASHINGTON, D. C.

(No Model.) 6 Sheets—Sheet 3.

O. SMITH.
PRESS.

No. 579,019. Patented Mar. 16, 1897.

Witnesses: Frank P. Prindle. Henry C. Hazard.

Inventor: Obulia Smith, by Prindle and Russell, his Attys.

(No Model.) 6 Sheets—Sheet 4.

O. SMITH.
PRESS.

No. 579,019. Patented Mar. 16, 1897.

Witnesses:
Frank P. Prindle.
Henry C. Hazard.

Inventor.
Oberlin Smith, by
Prindle and Russell, his Attys.

(No Model.) 6 Sheets—Sheet 5.

O. SMITH.
PRESS.

No. 579,019. Patented Mar. 16, 1897.

Witnesses
Frank P. Prindle.
Henry C. Hazard.

Inventor
Oberlin Smith, by
Prindle and Russell, his Attys.

(No Model.)  6 Sheets—Sheet 6.
O. SMITH.
PRESS.
No. 579,019. Patented Mar. 16, 1897.
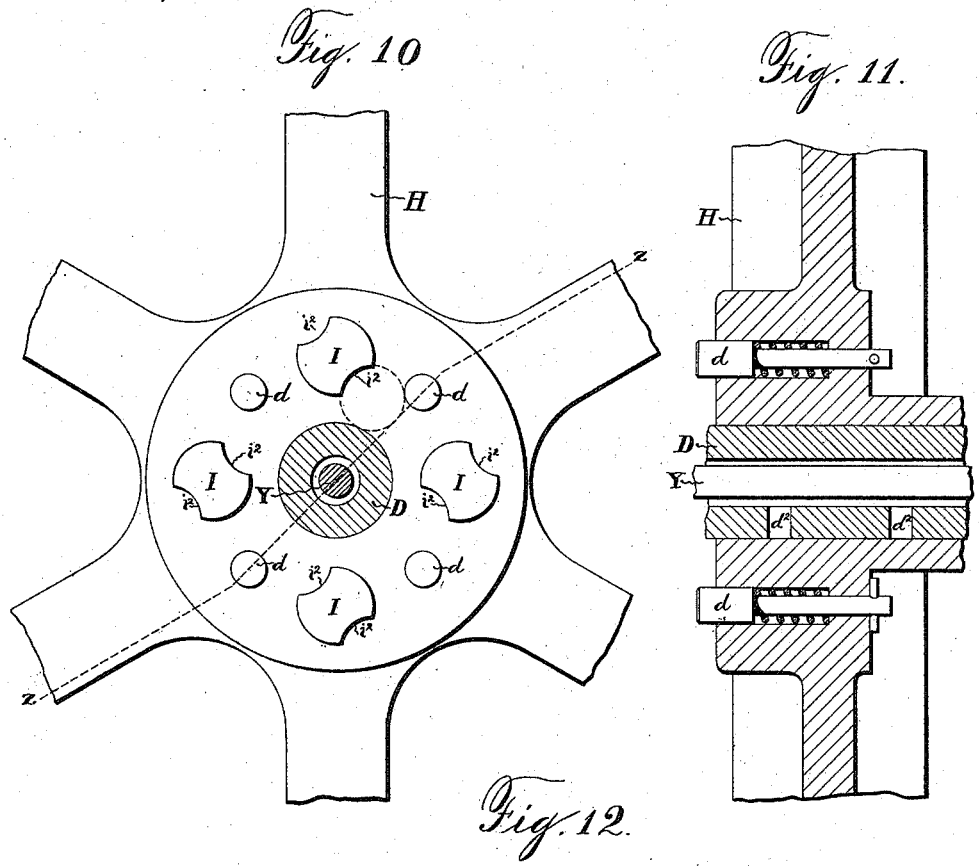
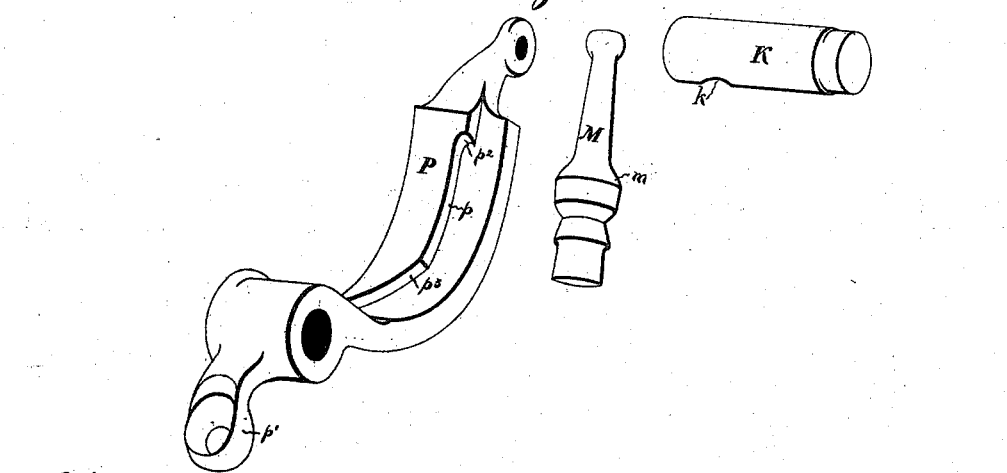
Witnesses
Frank P. Prindle
Henry C. Hazard
Inventor
Oberlin Smith, by
Prindle and Russell, his Att'ys

UNITED STATES PATENT OFFICE.

OBERLIN SMITH, OF BRIDGETON, NEW JERSEY.

PRESS.

SPECIFICATION forming part of Letters Patent No. 579,019, dated March 16, 1897.

Application filed June 5, 1896. Serial No. 594,453. (No model.)

*To all whom it may concern:*

Be it known that I, OBERLIN SMITH, of Bridgeton, in the county of Cumberland, and in the State of New Jersey, have invented certain new and useful Improvements in Presses; and I do hereby declare that the following is a full, clear, and exact description thereof, reference being had to the accompanying drawings, in which—

Figure 1:
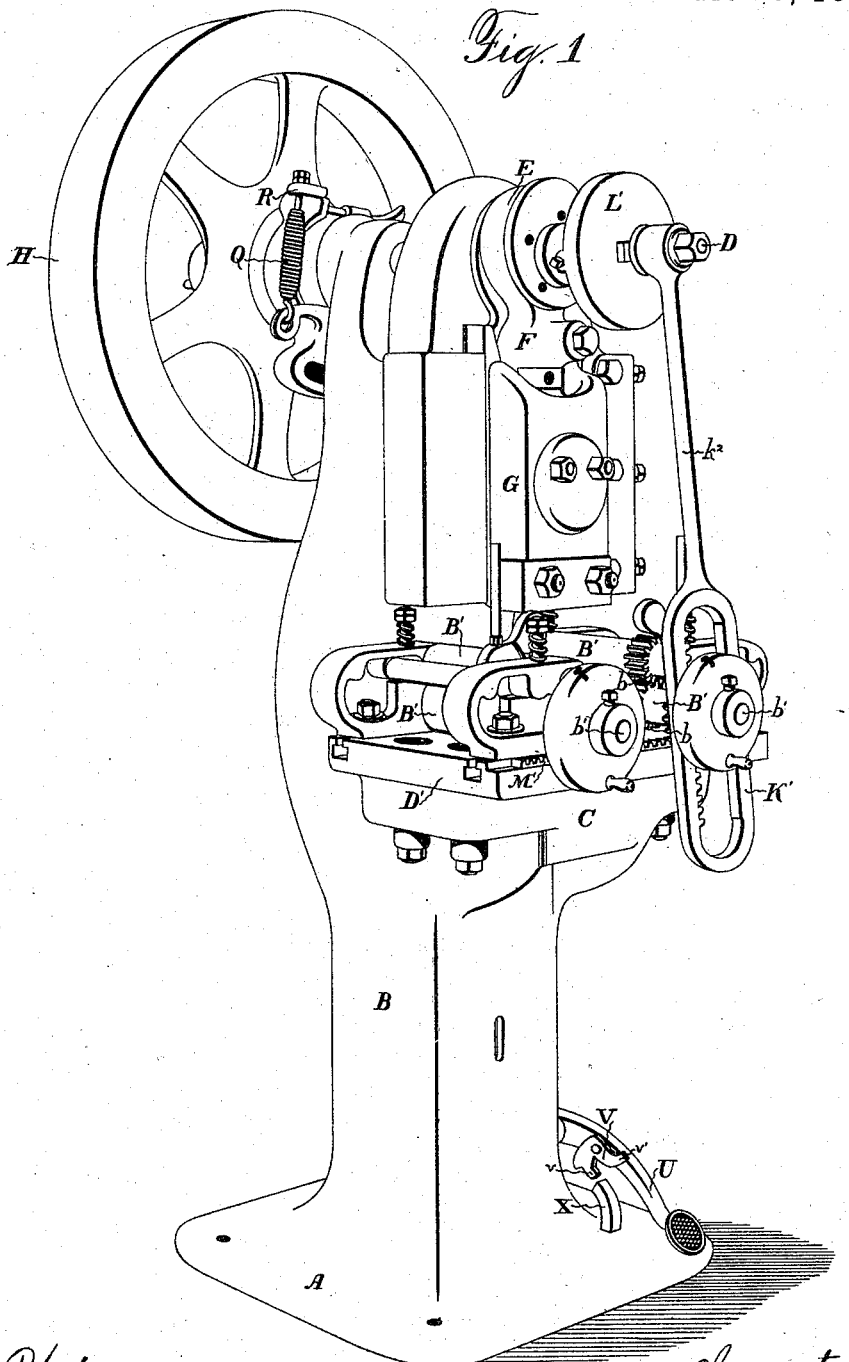
Figure 2:
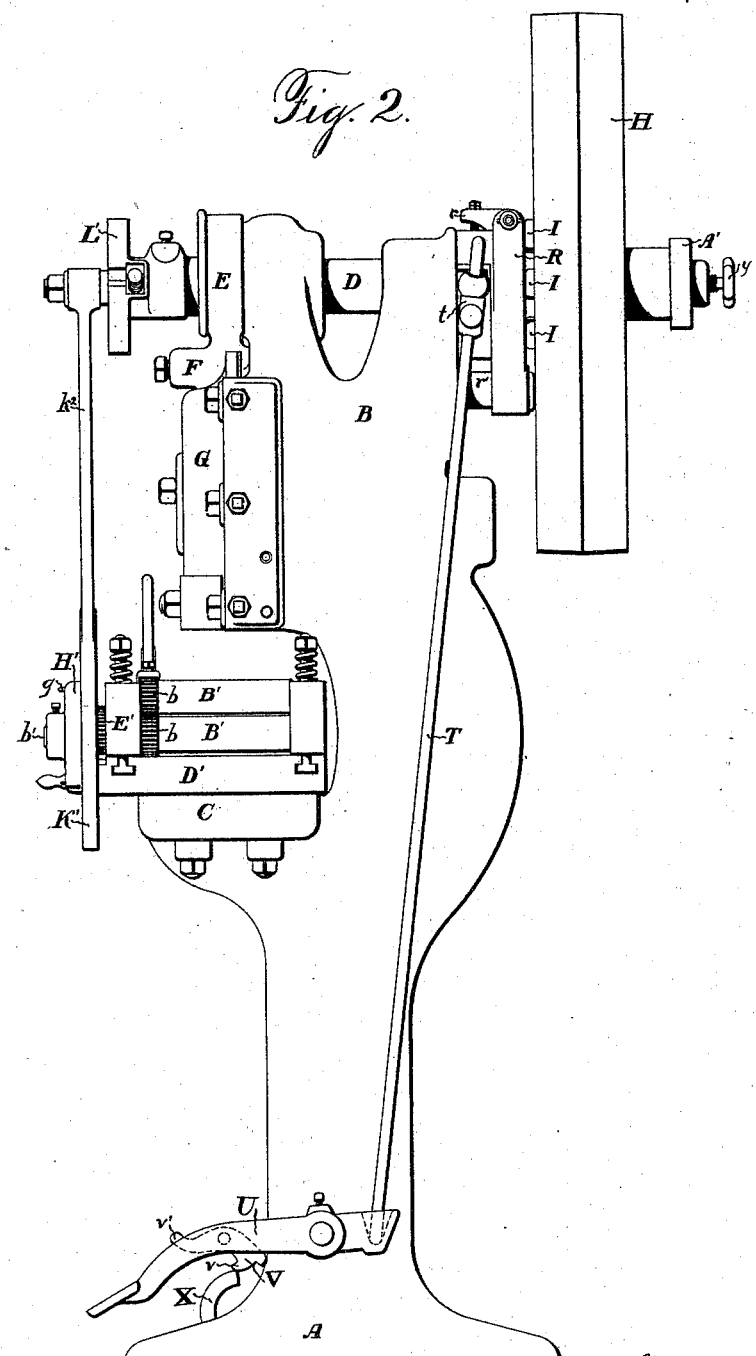
Figure 3:
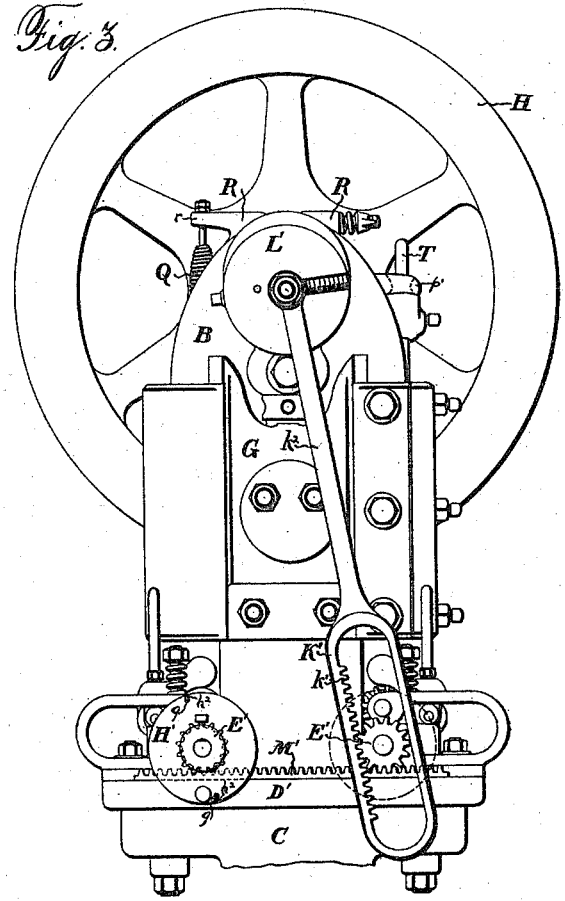
Figure 4:
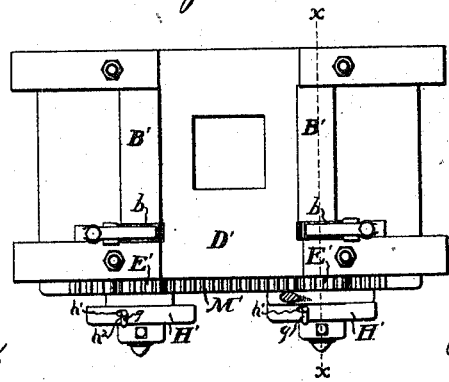
Figure 5:
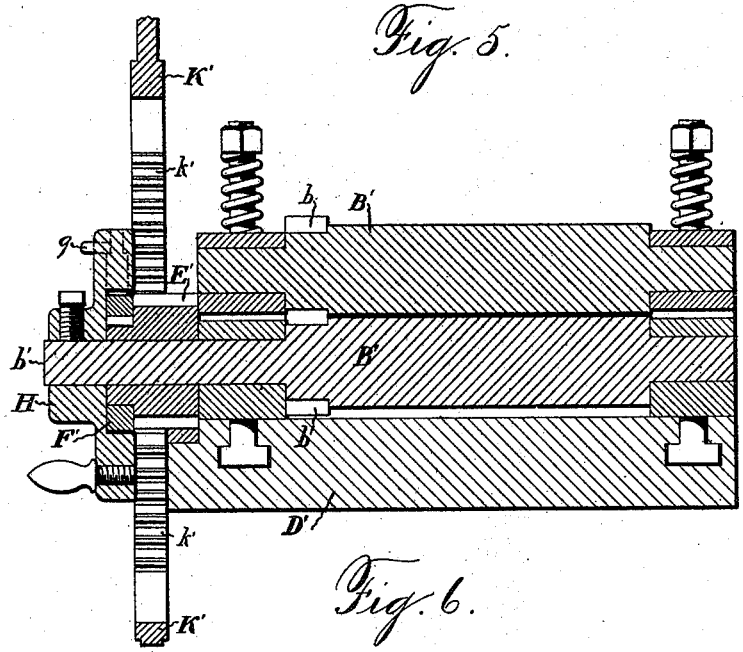
Figure 6:
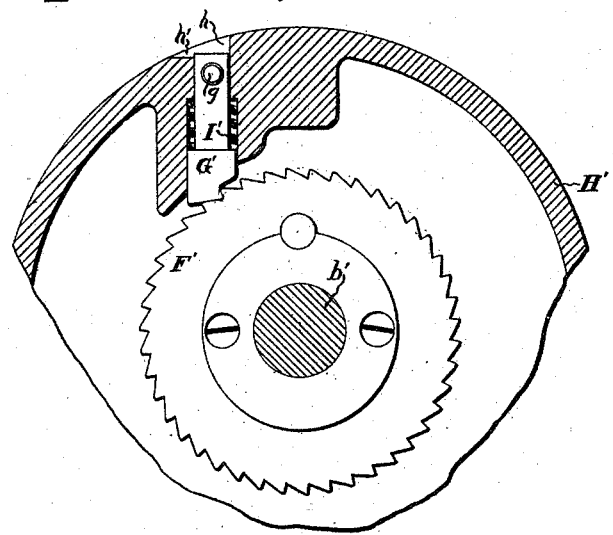
Figure 7:
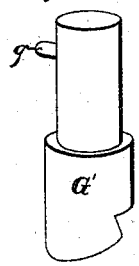
Figure 8:
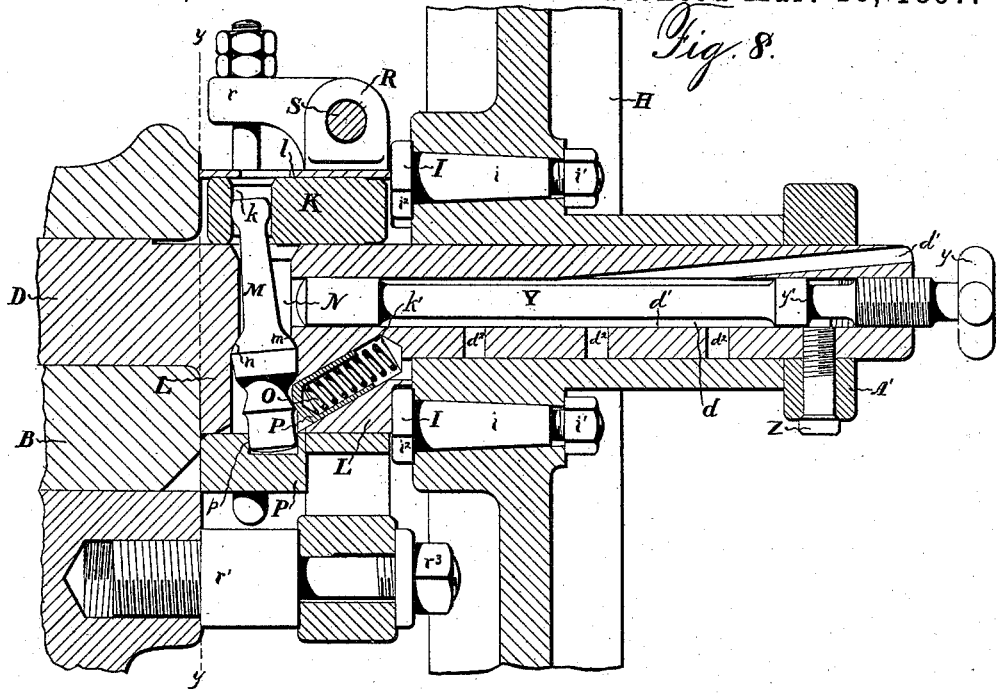
Figure 9:
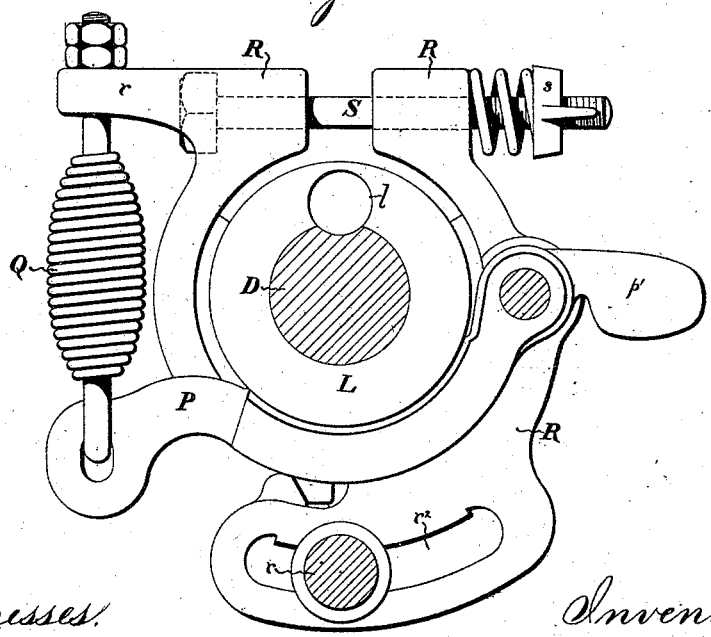

Figure 1 is a perspective view of my press; Fig. 2, a side elevation thereof; Fig. 3, a front elevation of the same; Fig. 4, a detail plan view of the feed mechanism; Fig. 5, a longitudinal section on the line $x\,x$ of Fig. 4; Fig. 6, a detail view, in section, of the pawl and ratchet of the feed mechanism; Fig. 7, a detail perspective view of the pawl. Fig. 8 is a longitudinal section of the clutch mechanism; Fig. 9, a cross-section of the same on the line $y\,y$ of Fig. 8; Fig. 10, a detail side view of the balance or drive wheel; Fig. 11, a section on the line $z\,z$ of Fig. 10, and Fig. 12 a detail perspective view of parts of the clutch mechanism separated from each other.

Letters of like name and kind refer to like parts in each of the figures.

The object of my invention is to provide certain improvements in presses; and to this end said invention consists in the construction and combination of parts, substantially as and for the purpose hereinafter specified.

In the carrying of my invention into practice I employ a cast-metal frame that consists of a base or pedestal A and an upright or standard B rising from the latter and having at its mid-height a bed C. Journaled in suitable bearings at the top of the standard is a horizontal shaft D, which, near its front end, carries an eccentric E, that is connected by a pitman F with a ram G, which is guided vertically in suitable ways provided on the front side of the standard B. At its bottom said ram carries the punch or other tool to be used.

Journaled loosely upon the rear end of the shaft D is a band or fly wheel H, that in presses of the type to which my invention pertains is revolved continuously and is clutched to and unclutched from the shaft to run and stop the press.

Upon its inner face the hub of the wheel H is provided with a circular series of studs or bosses I and I, as shown, four in number, that are equidistant apart and consist each of the head of a taper-pin $i$, secured firmly to the wheel-hub by a nut $i'$. Adapted to be moved into and out of position to engage any one of said studs, so as thereby to rotatively connect the wheel and shaft, is a pin or bar K, slidingly mounted in an opening or passage $l$, formed in an annular enlargement or collar L upon the shaft D adjacent to the wheel H, said opening lying parallel with the shaft-axis. Said clutch pin or slide is round in cross-section, and to afford a good bearing for the end of the same against each stud I the side of the latter is provided with a concave notch $i^2$. Preferably several notches $i^2$ are provided in each stud for successive use when wear renders a previously-used one unfit for further use.

As the space between adjacent studs I and I is greater than the diameter of the clutch-slide, I provide on the wheel between each pair of studs a sliding pin $d$, that is normally pressed outward beyond the face of the wheel by a coiled spring that, when the outer end of the pin is pressed against by the slide, will permit the pin to yield before the same, and as soon as the slide passes off the pin into contact with the stud will project the pin outward alongside of and in engagement with the slide, thus holding the latter closely against the engaged stud and avoiding backlash.

Near its inner end the clutch-slide is provided with a diametrically extending hole $k$, that is engaged by the end of a lever M, located in an opening N, that extends diametrically through the shaft enlargement L and provided at or near its longitudinal center with a concave seat $n$ for a convex or ball shaped enlargement $m$ on the lever at or near its longitudinal center, the lever being thus pivoted or fulcrumed without the use of a pin. Said lever can thus be easily placed in and removed from position, and the bearing, besides being an easy one, enables the lever to adjust itself to position without accurate fitting of the parts.

The lever is moved in the direction necessary to project the clutch-slide into position to engage the wheel-stud I by means of a coiled spring O, seated in an obliquely-extending cavity or hole $k'$ in the shaft enlargement K, whose outer portion is inclosed by a cup-shaped piece P, the closed end of which engages the side of the lever. The angle at which the hole $k'$ stands is such as to approximate the arc of a circle whose center is the center of motion of the lever M. The cup or piece P, besides being the means for applying power to the lever, engages the latter, so as to prevent it falling out of the opening $k$ or away from its bearing and constitutes a housing for the spring.

The end of the lever M opposite that engaging the clutch-slide projects outside of the shaft enlargement K and is normally engaged and held in opposition to movement by the spring O by means of a rib $p$ upon the inner face of a curved lever P, that is yieldingly pulled toward the periphery of the shaft enlargement by means of a coiled spring Q, attached at one end to the free end of the lever and at its other end to an arm or extension $r$ of a friction-brake R, applied to the shaft enlargement K adjacent to the lever P. The latter is also pivoted to said brake, and the brake is fastened to the standard B by means of a stud $r'$, screwed into the same. The means of connecting the stud and brake are such as to enable the latter to be adjusted around the shaft, said means consisting of an arc form slot $r^2$ in the lower part of the brake, through which a reduced part of the stud passes, and a nut $r^3$ on the outer end of the latter.

The brake consists of two curved jaws that have each at one end a portion to interlock with the other and at their other ends are connected by a bolt S, having a thumb-nut $s$, by means of which the pressure of the wood or other facing of the jaws upon the periphery of the shaft enlargement may be varied.

To operate the lever P to disengage its rib from the clutch-lever M and thus allow the clutch-slide to be moved by the spring O, said lever P is provided with an extension $p'$, that is engaged on the under side by a collar $t$ upon the upper end of a vertical rod T, whose lower end rests in engagement with a treadle U, by the action of which the rod may be raised.

Instead of the rod T to connect the treadle and lever P a chain may be used having one end connected with the eye of the lever to which the spring is attached, by which a downward pull can be given the lever.

To automatically unclutch the shaft from the wheel after one revolution, the rib $p$ of the lever P has an inclined edge $p^3$, with which the outer end of the clutch-lever M engages as the shaft revolves, and is thereby swung in opposition to the spring and withdraws the clutch-slide from engagement with the wheel. Of course to permit the rib $p$ so to act the treadle U must be released to permit the lever P to return to normal position sufficiently soon to interpose the rib in the path of the end of the lever M.

To insure the stoppage of the shaft D after being unclutched, the rib $p$ is extended inwardly to form a stop $p^2$, against which the end of the lever M will strike as it is carried around by the shaft.

By mounting the lever P upon the brake and making the latter adjustable, as heretofore described, the point in the revolution of the shaft where the lever M engages the cam or incline $p^2$ of the rib $p$ can be varied so as to throw off the clutch sooner or later to suit varying conditions of the press as respects load on shaft, &c.

If it should be desired to prevent automatic unclutching after one revolution, such can be done by locking the treadle, so as to hold the lever P out of the path of the lever M. A simple lock for this purpose is shown, that consists of a plate V, pivoted to the side of the treadle and having a hook $v$ to catch under a hook form lug X, projecting from the frame-base A. Said lock-plate V is provided with an arm or extension $v'$, by which it may be readily released from the lug X by use of the foot.

To enable the clutch mechanism to be locked, so as to be inoperative, I provide a longitudinal opening $d$ at the center of the shaft D, which extends from the outer end thereof to the lever containing opening $k$, and put in such opening $d$ a rod Y, that is adapted to be moved longitudinally to place its inner end into and out of contact with the lever M, and in the former case hold the latter from movement. Near its outer end the rod Y is screw-threaded to engage thread in the opening $d$, whereby the desired longitudinal movements may be given it, and for its convenient rotation it is provided with a handle $y$. To prevent the momentum from its revolution with the shaft from causing the rod to move inward and accidentally engage the lever M, the screw-threads thereof are given a direction to cause it to move outward. To limit its outward movement, the end of a screw Z, passing radially inward through an opening in the shaft D, projects into the opening $d$ in position to engage an annular shoulder $y'$ upon the rod. Said screw Z is also utilized to secure to the shaft the collar $A'$, that confines the wheel H in position on the shaft by engaging the outer end of the hub of said wheel.

Extending obliquely inward from the outer end of the shaft D to the opening $d$ is an oil-hole $d'$, and for the passage of oil delivered to the latter therefrom to the hub of the wheel H is a number of radial openings $d^2$ and $d^2$, that extend from the opening $d'$ to the periphery of the shaft D. The rod Y for considerable of its length between its ends is reduced in diameter to give ample space around it within the opening $d'$ for the reception of oil. The radial openings $d^2$ and $d^2$ are so located that when the shaft is at rest they are upon the under side of the same, and as there is a slight space between the under side of the shaft and the wheel-hub by reason of the weight of the wheel oil has opportunity to freely pass to the latter. It will be seen that I thus utilize the opening $d$, required for the stop-rod, as an oil receptacle or passage, and as the opening $d'$ for conveying the oil thereto is in the shaft and not the wheel the oiling can be done when the latter is running, and enough oil leaks past the rod Y to oil the clutch also.

My clutch mechanism is extremely simple and is cheap of construction, as all work is merely lathework and drilling. No screws are used in holding together the clutch parts proper.

For feeding work to be punched there is a pair of feed-rolls B' and B' on each side of the punch arranged one above the other and geared together by wheels $b$ and $b$. The bearings of said rolls are secured to a bolster-plate or table D', that is bolted to the press-bed C, and the connections between the bearings and the table D' are adjustable to enable the two pairs of rolls to be moved toward and from each other, according to the requirements of the work to be fed.

The journal $b'$ of the lower roll of each pair is extended beyond its bearing, and upon the same is loosely mounted a gear E', that on one side carries or has attached to it a ratchet-wheel F', with which engages a pawl G'. The latter is in the form of a sliding pin carried by a disk or wheel H', that is fixed upon the journal $b'$, and constitutes the means whereby the revolution of the gear E' in one direction will cause the rotation of the feed-rolls, while its revolution in an opposite direction will be without effect thereon.

The opening $h$ in the disk in which the pawl is placed is formed in a peripheral flange or projection thereon and lies in a direction tangential and not radial to the center of the ratchet-wheel. By thus locating the pawl relative to the ratchet-wheel not only is outward tendency of the pawl avoided, but, on the contrary, its tendency when engaging a tooth of the wheel is inward, and the effect is thus to more firmly engage the same and the wheel. There is also avoided a great deal of friction of the pawl against the side of the opening $h$ when the pawl is forced outward on the back rotation of the ratchet-wheel, as sidewise tendency of the pawl from pressure of the wheel-teeth is very slight. To wholly obviate such tendency, I incline the end of the pawl against which the inclined face of the tooth bears, so as to produce a tendency in the opposite direction to balance that caused by the back rotation of the wheel.

A coiled spring I', encircling the pawl and interposed between a shoulder thereon, and one formed in the opening $h$ operates to move the pawl into yielding engagement with the ratchet-wheel.

At or near its outer end the pawl is provided with a radial pin $g$, which projects through and plays in a slot $h'$ in the side of the disk H' and thereby holds the pawl from rotating. Said pin also forms a handle by which the pawl may be lifted out of engagement with the ratchet-wheel, and if it be desired to hold the pawl thus such can be done by partially rotating the same to take the pin out of alinement with the slot $h'$ and cause it to engage the periphery of the disk H'. Preferably a notch $h^2$ is provided in such periphery to receive the pin to hold the pawl from accidental turning, and when the disk H' is moved away from the ratchet-wheel the pin $g$ serves to prevent the pawl and spring from escaping out of the opening $h$.

The pawl G', besides being very efficient and convenient to manipulate, is cheap of construction, as being a cylindrical pin it can be formed in a screw-machine, and its mounting in the disk is cheap and easy, as it merely requires a counterbored round hole. A further element of cheapness is the use of the coil-spring which is possible with my pin form of pawl, such form of spring being much cheaper than a flat spring that requires fastening means.

Meshing with the gear-wheel E' of one of the lower feed-rollers is a straight line of rack-teeth $k$ on the inner face of a loop K', into which the gear extends, and which is connected by a bar $k'$ to a crank L', mounted upon the front end of the shaft D. The revolution of the latter thus causes the reciprocation of the rack and the rotation of the gear E'. To transmit the movement of the latter to the like wheel of the other pair of rolls, a rack-bar M' is employed that meshes with both of said wheels and is supported and guided in a way upon the upper side of the table or bolster D'. The rack-bar connection between the two wheels besides being simple permits the ready shifting of position of the pairs of rolls when the distance between them is to be changed.

It will be apparent that a complete feed mechanism can be had with but one pair or set of rolls, it being necessary simply to discard the rack-bar M' and the pair of rolls driven thereby, and hence I wish it understood that the scope of my invention extends to constructions where but a single pair of rolls is used; and I also wish it understood that such features of my invention as are applicable of use independent of the others are deemed to be within the scope of my invention when thus independently used.

My rack-bar and pinion device for revolving the feed-rolls possesses marked advantage over a pitman and lever for the same purpose, since in the latter case the greatest travel of the pawl in a feeding stroke must be much less than one hundred and eighty degrees, with a corresponding limitation in the movement of the feed-roll, while the feeding stroke of the rack-bar can be operative to revolve the feed-rolls one or more times. I can thus use rolls of a smaller diameter for effecting the same distance of feed than with the pawl-and-ratchet-wheel construction and a pinion of less diameter than that of the ratchet-wheel.

Having thus described my invention, what I claim is—

1. In a clutch for presses, &c., the combination of a shaft, a wheel, a slide carried by the shaft, located at one side of the wheel, and movable into and out of engagement with the wheel side, a lever pivoted within an opening in the shaft, engaging the slide, and means for operating the lever, substantially as and for the purpose specified.

2. In a clutch for presses, &c., the combination of a shaft, a wheel, a slide carried by the shaft located at one side of the wheel and movable into and out of engagement with the wheel side, a lever in an opening extending through the shaft from side to side, with one end engaging the slide, and means for operating said lever, that engage the end at the side of the shaft opposite the slide, substantially as and for the purpose shown.

3. In a clutch for presses, &c., the combination of a shaft, a wheel, a slide carried by the shaft and movable into and out of engagement with the wheel, a lever pivoted within an opening extending diametrically through the shaft, and engaging said slide, a spring to move the lever in one direction, and means for moving the lever in opposition to the spring, that acts on the same part of the lever, relative to its fulcrum, that the spring does substantially as and for the purpose set forth.

4. In a clutch for presses, &c., the combination of a shaft, a wheel, a slide carried by the shaft and movable endwise into and out of engagement with a projection on the side of the wheel, a lever pivoted within an opening extending diametrically through the shaft, a spring for moving the lever in one direction, and a cam for moving the lever in the opposite direction, substantially as and for the purpose described.

5. In a clutch for presses, &c., the combination of a shaft, a wheel, a slide to clutch said parts together, a lever pivoted within an opening in the shaft, and connected with said slide, a spring for moving the lever in one direction, a pivoted arm having a stop to engage said lever, and a cam adapted to be engaged by the lever, substantially as and for the purpose set forth.

6. In a clutch for presses, &c., the combination of a shaft, a wheel, a slide to clutch said parts together, a lever pivoted within an opening in the shaft, and connected with said slide, a spring, a cup-shaped piece fitting over the spring and engaging the lever, and means to move the lever in opposition to the spring, substantially as and for the purpose described.

7. In a clutch for presses, &c., the combination of a shaft, a wheel, a slide to clutch said parts together, carried by one of the same, a lever within an opening in the slide-carrying part fulcrumed on a seat formed on the wall of said opening, and means to actuate the lever, substantially as and for the purpose shown.

8. In a clutch for presses, &c., the combination of a shaft, a wheel, a slide to clutch said parts together, carried by the shaft, a lever loosely mounted in an opening in the shaft, and having a bearing on a seat provided on the wall of the opening intermediate its ends, a spring for moving said lever and holding it to its bearing, and means to move it in opposition to the spring, substantially as and for the purpose shown.

9. In a clutch for presses, &c., the combination of a shaft, a wheel, a clutch-slide carried by the shaft, a lever loosely mounted in an opening in the shaft having a rounded enlargement whose surface rests in contact with a bearing in said opening, a spring for moving said lever and holding it to its bearing, and means to move the lever in opposition to the spring, substantially as and for the purpose set forth.

10. In a clutch for presses, &c., the combination of a wheel, a shaft having an enlargement at one side of the wheel, a clutch-slide to engage the wheel side, mounted in an opening in said enlargement, outside of the surface of the shaft-body within the wheel, a lever mounted in an opening extending through the shaft, and means acting on the lever to swing the same to move the slide substantially as and for the purpose described.

11. In a clutch for presses, &c., the combination of a wheel, a shaft having an enlargement, a clutch-slide round in cross-section, and mounted in an opening in said enlargement, a lever, round in cross-section, mounted loosely in an opening extending diametrically through the shaft, and at one end engaging the slide and means for acting on the other end of the lever to swing the same in opposite directions, substantially as and for the purpose specified.

12. In a clutch for presses, &c., the combination of a wheel, a shaft, a clutch-slide for connecting them, means for moving said slide, a device to hold said slide from movement to clutching position, means for actuating said device and a lock to hold said slide inoperative, substantially as and for the purpose described.

13. In a clutch for presses, &c., the combination of a wheel, a shaft, a clutch-slide for connecting them, a lever for moving said slide, means for moving said lever to thereby cause it to move the slide, and a lock adapted to engage said lever, substantially as and for the purpose described.

14. In a clutch for presses, &c., the combination of a wheel, a shaft, a clutch-slide carried by the shaft, a lever for moving said slide, means for actuating the lever, and a lock mounted in the shaft to engage the lever so as to hold said slide inoperative, substantially as and for the purpose shown.

15. In a clutch for presses, &c., the combination of a wheel, a shaft, a clutch-slide carried by the shaft, a lever carried by the shaft for actuating said slide, and a rod mounted in the shaft and adapted to be moved into contact with the lever to lock the same against movement, substantially as and for the purpose shown.

16. In a clutch for presses, &c., the combination of a wheel, a shaft, a clutch-slide carried by the shaft, a lever engaging said slide, pivoted within an opening in the shaft, and a longitudinally-movable rod mounted in an opening in the shaft and adapted to be moved into and out of engagement with the lever, substantially as and for the purpose described.

17. In a clutch for presses, &c., the combination of a wheel, a shaft, a clutch-slide carried by the shaft, a lever engaging said slide, pivoted within an opening in the shaft, and a longitudinally-movable threaded rod, mounted in an opening in the shaft, substantially as and for the purpose specified.

18. In a clutch for presses, &c., the combination of a wheel, a shaft, a clutch-slide carried by the shaft, a lever engaging said slide, pivoted within an opening in the shaft, a longitudinally-movable threaded rod, mounted in an opening in the shaft, and a stop to limit the movement of said rod, substantially as and for the purpose shown.

19. The combination of a wheel, a shaft on which the same is loosely journaled, a clutch mechanism, a locking-rod for the clutch extending through an opening in the shaft, an oil-passage leading to said opening, and a passage or passages leading from said opening to the exterior of the shaft on which the wheel is mounted, substantially as and for the purpose set forth.

20. The combination of a wheel, adapted to be continuously rotated, a shaft on which the same is loosely journaled, provided with an oil passage or passages, a clutch mechanism for clutching the wheel and shaft together, and means for unclutching said parts and causing the stoppage of the shaft with its oil passage or passages at the lower side thereof, substantially as and for the purpose described.

21. In a clutch for presses, &c., the combination of a wheel, a shaft, a clutch-slide, a lever to operate said slide, and an adjustably-mounted part that engages and operates the lever, substantially as and for the purpose specified.

22. In a clutch for presses, &c., the combination of a wheel, a shaft, a clutch-slide, a lever having one end engaging the latter, and an adjustable device for engaging the other end of the lever, substantially as and for the purpose shown.

23. In a clutch for presses, &c., the combination of a wheel, a shaft, a clutch mechanism, a cam to release the clutch, and an adjustable support for said cam, substantially as and for the purpose shown.

24. In a clutch for presses, &c., the combination of a wheel, a shaft, a clutch mechanism, an adjustably-mounted brake, and a clutch-releasing device supported on the latter, substantially as and for the purpose set forth.

25. In a clutch for presses, &c., the combination of a wheel, a shaft, a clutch mechanism, an adjustably-mounted brake, and a clutch-operating lever, pivoted to the brake, substantially as and for the purpose described.

26. In a feed mechanism for presses, &c., the combination of two rolls having each a gear, and adjustable toward and from each other, a rack-bar meshing with both gears, and means for driving one of the latter, substantially as and for the purpose set forth.

27. In a feed mechanism for presses, &c., the combination of two rolls, having each a gear, and adjustable toward and from each other, a rack-bar meshing with both gears, a rack meshing with one of said gears, and means to reciprocate said rack, substantially as and for the purpose set forth.

28. In a feed mechanism for presses, the combination of the ram-moving shaft, a crank carried thereby, the two sets of feed-rolls having each a gear, a rack connected with said crank and meshing with one of said gears, and a rack-bar meshing with both gears, substantially as and for the purpose described.

29. The combination of a ratchet-wheel, and a sliding pawl, having an abrupt side adapted for locking engagement with the teeth of the wheel, and a side or face that inclines from said abrupt side inward toward the wheel and engages the peripheral face of the tooth, substantially as and for the purpose specified.

In testimony that I claim the foregoing I have hereunto set my hand this 19th day of May, A. D. 1896.

OBERLIN SMITH.

Witnesses:
JAMES J. REEVES,
HUGH L. REEVES.